(12) United States Patent
Lo et al.

(10) Patent No.: US 9,946,244 B2
(45) Date of Patent: Apr. 17, 2018

(54) INTELLIGENT PROGRAMMABLE LOGIC CONTROLLER

(71) Applicant: Siemens Aktiengesellschaft, Munich (DE)

(72) Inventors: George Lo, Yardley, PA (US); Steffen Lamparter, Feldkirchen (DE); Lingyun Wang, Princeton, NJ (US); Hartmut Ludwig, West Windsor, NJ (US)

(73) Assignee: Siemens Aktiengesellschaft, Munich (DE)

( * ) Notice: Subject to any disclaimer, the term of this patent is extended or adjusted under 35 U.S.C. 154(b) by 562 days.

(21) Appl. No.: 14/467,125

(22) Filed: Aug. 25, 2014

(65) Prior Publication Data

US 2016/0054720 A1 Feb. 25, 2016

(51) Int. Cl.
*G05B 19/05* (2006.01)

(52) U.S. Cl.
CPC ......... *G05B 19/056* (2013.01); *G05B 19/054* (2013.01); *G05B 2219/14018* (2013.01); *G05B 2219/14055* (2013.01)

(58) Field of Classification Search
CPC ............... G05B 19/054; G05B 19/056; G05B 2219/14018; G05B 2219/14055
USPC ........................................................ 700/87
See application file for complete search history.

(56) References Cited

U.S. PATENT DOCUMENTS

| | | | | |
|---|---|---|---|---|
| 2002/0116139 A1* | 8/2002 | Przydatek | ............... | G01D 4/004 702/62 |
| 2003/0204560 A1* | 10/2003 | Chen | ...................... | G05B 19/05 709/203 |
| 2008/0114571 A1* | 5/2008 | Campbell | .......... | G05B 19/4183 702/189 |
| 2008/0125887 A1* | 5/2008 | Case | ................... | G05B 23/0272 700/83 |
| 2009/0089232 A1 | 4/2009 | Baier et al. | | |
| 2012/0254517 A1* | 10/2012 | Jang | ....................... | G05B 19/05 711/103 |

(Continued)

FOREIGN PATENT DOCUMENTS

| | | |
|---|---|---|
| EP | 1576432 A2 | 9/2005 |
| EP | 1921527 A2 | 5/2008 |

OTHER PUBLICATIONS

PCT International Search Report dated Nov. 20, 2015 corresponding to PCT International Application No. PCT/US2015/046647 filed Aug. 25, 2015 (11 pages).

*Primary Examiner* — Yuhui R Pan

(57) ABSTRACT

A method of operating an intelligent programmable logic controller over a plurality of scan cycles includes creating, by the intelligent programmable logic controller, a process image area in a volatile computer-readable storage medium operably coupled to the intelligent programmable logic controller. The intelligent programmable logic controller then updates the process image area during each scan cycle with contents comprising data associated with a production unit. The contents of the process image area are stored by the intelligent programmable logic controller during each scan cycle on a non-volatile computer-readable storage medium operably coupled to the intelligent programmable logic controller. The intelligent programmable logic controller annotates the contents of the process image area with automation system context information to generate contextualized data.

19 Claims, 3 Drawing Sheets

(56) References Cited

U.S. PATENT DOCUMENTS

2013/0178970 A1 7/2013 Columbo
2014/0344511 A1* 11/2014 Kim .................. G06F 3/0661
                                                                       711/105

\* cited by examiner

INTELLIGENT PROGRAMMABLE LOGIC CONTROLLER

TECHNICAL FIELD

The present invention relates generally to an intelligent programmable logic controller configured to provide on-device data analysis and storage, along with methods, systems, and apparatuses related thereto. The disclosed technology may be applied to, for example, various automated production environments where programmable controllers are used.

BACKGROUND

A programmable logic controller (PLC) is a specialized computer control system configured to execute software which continuously gathers data on the state of input devices to control the state of output devices. A PLC typically includes three major components: a processor (which may include volatile memory), volatile memory comprising an application program, and one or more input/output (I/O) ports for connecting to other devices in the automation system.

PLCs are utilized in various industrial settings to control automation systems. Automation systems typically generate a large amount of data in their daily operations. This data may include, for example, sensor data, actuator and control program parameters, and information associated with service activities. However, conventional automation systems, and PLCs in particular, are not capable of fully utilizing this data. For example, in most systems, due to hardware and software limitations, only a small fraction of this data can be analyzed and stored. Massive amounts of irrelevant data may be produced while important data points are missed. Compression may be applied at the higher automation layers on unimportant data, while important data is lost while travelling through the automation layers. Moreover, even where there are attempts to avoid the loss of data, there may be significant demands placed on the rest of the computing infrastructure. For example, the PLC data processing may result in a high demand on the network bandwidth as well as storage capacity. Additionally, the context of data may be lost while data passed through automation system layers. This causes several undesired secondary effects on the automation system. For example, if data analytics are performed at higher automation layers based on low quality/fidelity data, important data may be lost causing the automation system to operate inefficiently or sub-optimally.

Insufficient data handling capabilities in automation systems also lead to various other concrete problems. If the resolution/sampling rate of data acquisition is not sufficient, many machine events may not be detected. For example, if stops of machine in millisecond range are missed by manufacturing intelligence, key performance indicator (e.g. Overall Equipment Effectiveness) calculation is inaccurate. Quality problems may not be immediately detected, as only very few process variables can be continuously monitored.

Additionally, in PLCs, context knowledge about the process available on control level is lost for the business analytics applications. A great deal of effort is required to rebuild such context knowledge at higher layers of the automation system. In particular, the realization of higher level software functionality in Supervisory Control and Data Acquisition (SCADA), Manufacturing Execution Systems (MES), or Enterprise Resource Planning (ERP) systems becomes much more complicated and costly. In turn, this leads to higher development and customization costs of these solutions. For example, consider a valve control program for controlling coolant flow until tank temperature reaches a certain level. One can infer that there has to be a certain correlation between coolant flow rate and temperature decrease (with some delay). To detect such correlations (which can be utilized for predictive process monitoring on business layer) a pairwise correlation analysis using hundreds of parameters is required.

Conventional PLCs also lack any ability of performing online analysis of control level data. Business analytics may be done offline and support retrospective analysis of past production (e.g., past batches). However, online analysis of production is only possible with some delay and therefore direct intervention into control based on the analysis is mostly not possible. Moreover, it is not possible to implement statistical quality and process control based on the hidden variables (i.e., data points that are internally used within the PLC, for example, to control a process or parameterize the sensors, actuators or control program) and control parameters because such data is not available outside the control layer. However, such data is important and can lead to early detection of quality issues.

SUMMARY

Embodiments of the present invention address and overcome one or more of the above shortcomings and drawbacks, by providing methods, systems, and apparatuses related to a PLC configured to perform various functions on the device itself, rather than processing data externally. This PLC, referred to herein as an "Intelligent PLC," includes various components which may be configured to provide an assortment of enhanced functions in control applications. For example, in some embodiments, the Intelligent PLC includes a deeply integrated data historian and analytics functions. This technology is particularly well-suited for, but not limited to, various industrial automation settings.

According to one embodiment of the present invention, a method of operating an Intelligent PLC over a plurality of scan cycles includes creating a process image area in a volatile computer-readable storage medium. The Intelligent PLC then updates the process image area during each scan cycle with contents comprising data associated with a production unit. The contents of the process image area are stored by the Intelligent PLC during each scan cycle on a non-volatile computer-readable storage medium. The Intelligent PLC annotates the contents of the process image area with automation system context information to generate contextualized data. The automation system context information may include, for example, one or more of an indication of a device that generated the data, a structural description of an automation system comprising the Intelligent PLC, a system working mode indicator, and information about a product that was produced when the contents of the process image area were generated. Additionally or alternatively, the contextualized data may include one or more of a description of automation software utilized by the Intelligent PLC or a status indictor indicative of a status of the automation software while the contents of the process image area were generated.

The aforementioned method may be enhanced with additional features in some embodiments. For example, in one embodiment, the Intelligent PLC applies one or more data analytics algorithms to the contents of the process image area or the contextualized data to yield calculated data. The Intelligent PLC then adjusts one or more data generation parameters of the production unit based on the calculated data. In another embodiment, the one or more data analytics algorithms may be executed on the historical process image data retrieved from the non-volatile computer-readable storage medium.

Additionally, the Intelligent PLC may perform various compression procedures. For example, in one embodiment, the Intelligent PLC compresses the contents of the process image area during each scan cycle prior to storing the contents on the non-volatile computer-readable storage medium. In another embodiment, the Intelligent PLC compresses and stores the contextualized data that it generates.

The aforementioned method may also be used as part of an apparatuses or article of manufacture. For example, in some embodiments, an article of manufacture for operating an the Intelligent PLC over a plurality of scan cycles includes a non-transitory, tangible computer-readable medium holding computer-executable instructions for performing the method, with or without the enhancements discussed above.

According to another aspect of the present invention, an Intelligent PLC includes a processor configured to execute according to a scan cycle, a volatile computer-readable storage medium comprising a process image area, a non-volatile computer-readable storage medium, and controller components executed by the processor according to the scan cycle. The controller components may include, for example, a data transfer component configured to update the process image area during each scan cycle with contents associated with a production unit, a control application component configured to execute application logic on the contents of the process image area; and a historian component configured to store the contents of the process image area during each scan cycle on the non-volatile computer-readable storage medium. The historian component may be further configured to adjust one or more data generation parameters (e.g., sampling rate) of the production unit based on the calculated data. The historian data may also be configured to compress the contents of the process image area during each scan cycle prior to storing the contents on the non-volatile computer-readable storage medium.

In some embodiments, the aforementioned Intelligent PLC may include additional components. For example, in one embodiments, the controller includes a contextualization component configured to generate contextualized data by annotating the contents of the process image area with automation system context information, and a data connector component configured to transmit the contextualized data to one or more external components. In another embodiment, the Intelligent PLC includes a data analytics component configured to execute one or more data analytics algorithms on the contextualized data to yield calculated data. The data analytics component may also be configured to execute data analytics algorithms on historical process image data retrieved from the non-volatile computer-readable storage medium.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

Systems, methods, and apparatuses are described herein which relate generally to an intelligent programmable logic controller (PLC), referred to herein as a "Intelligent PLC" which is configured to store and analyze data on the PLC itself, rather than requiring external devices for storage and processing. The technology described herein may be applied in a variety of settings where control systems are used including, without limitation, industrial production environments.

Briefly, the Intelligent PLC offers several technical features which may be present in various combinations, according to different embodiments of the present invention. The Intelligent PLC provides efficient data storage on control layer devices. More specifically, selected of the control layer may be extended by an efficient storage mechanism for time series data (i.e., a "historian" function) which allows short-/mid-term archiving of high resolution time-stamped data. With high fidelity data, few, if any, events are lost. Efficient compression algorithms (e.g. a variation of swinging door) may be used to reduce storage and communication demands. The Intelligent PLC may also offer an intelligent on-device data generation method in some embodiments of the present invention. Methods for data filtering may be applied directly where data is generated to ensure that additional data is only stored if it provides additional information content. These methods may also actively analyze incoming data and configure data acquisition according to the current needs, for example, by adjusting the sample rate or by storing data only if certain events have been detected. The Intelligent PLC may also enable rich and semantic contextualization, and perform control layer semantic analytics. Additionally, in some embodiments, the Intelligent PLC also provides distributed analytics across automation systems.

Figure 1:
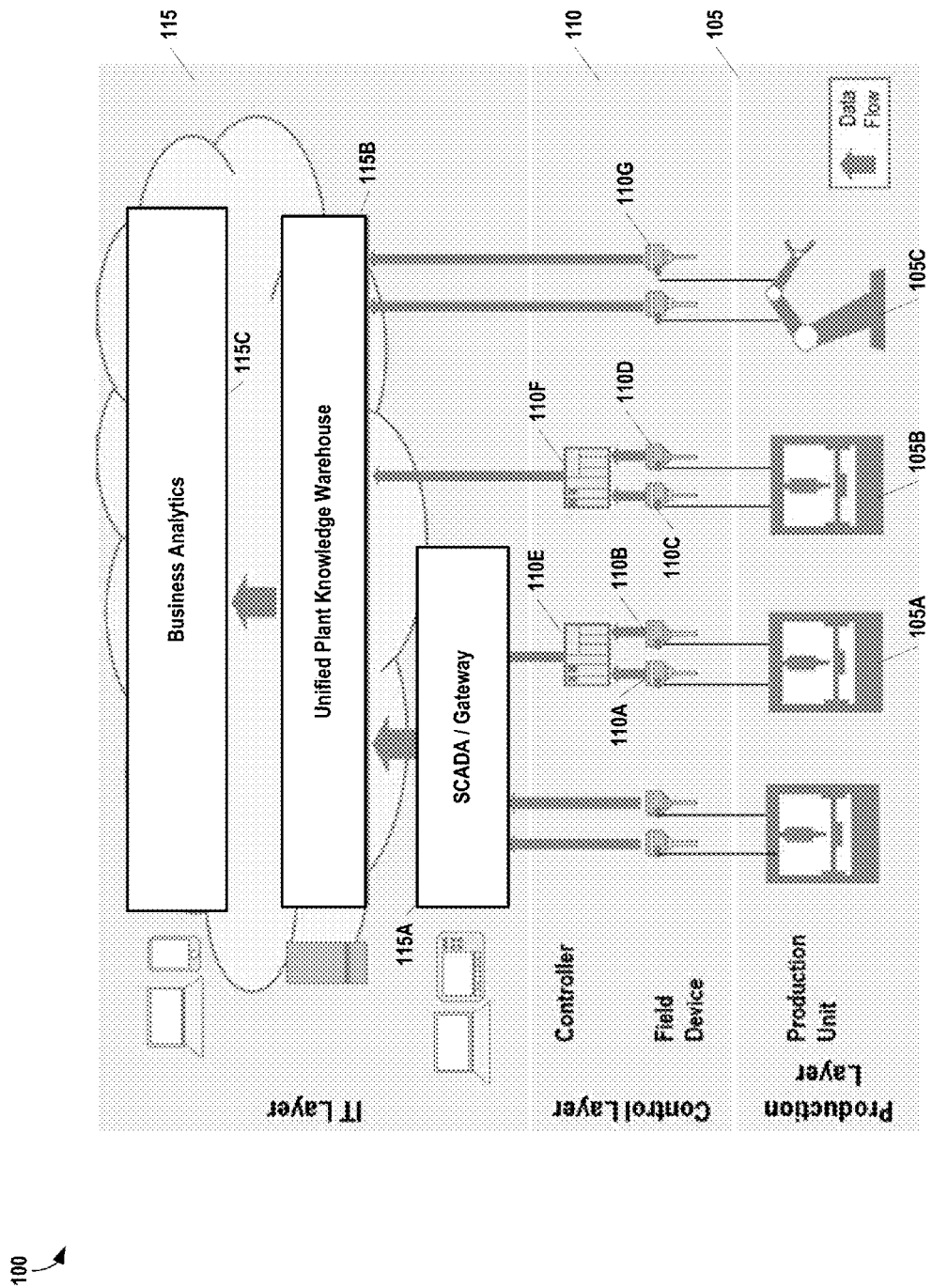
FIG. 1 provides a system view of Intelligent PLCs integrated into an industrial environment, according to some embodiments of the present invention.

FIG. 1 provides a system view of an Intelligent PLCs integrated into an automation system 100, according to some embodiments of the present invention. This example conceptually partitions the industrial environment into a Production Layer 105, a Control Layer 110, and an IT Layer 115. In conventional systems, most data handling functions are performed at the IT Layer 115. Using the Intelligent PLCs 110E and 110F, the system 100 illustrated in FIG. 1 pushes many of these data handling functions down to the Control Layer 110. For example, in some embodiments, historian capabilities such as efficient data compression for time-series data and intelligent filtering of data may be implemented directly on the Intelligent PLCs 110E and 110F. This allows the Control Layer 115 to utilize high-fidelity data with less storage/communication effort such that few, if any, events go undetected. In some embodiments, the Intelligent PLCs 110E and 110F also provide rich contextualization functionality. By adding control level knowledge to data, it may not be necessary to re-discover knowledge on Business Analytics 115C at the IT Layer 115. Additionally, in some embodiments, the Intelligent PLCs 110E and 110F provide data analytics functionality directly on their respectively device, thus increasing machine and process efficiency.

Continuing with reference to FIG. 1, at the Production Layer 105, one or more production units (e.g., Unit 105A) operate. Each production unit sends and receives data through one or more field devices (e.g., Field Device 110A) at the Control Layer 110. At the Control Layer 110, each field device may be connected to an Intelligent PLC (e.g., Intelligent PLC 110E). Data received from the production units is transferred (either directly by the field devices or via an Intelligent PLC) to the IT Layer 115. The IT Layer 115 includes systems which perform various post-processing and storage tasks. The example of FIG. 1 includes a Supervisory Control and Data Acquisition (SCADA) Server (or Gateway) Component 115A. This Component 115A allows an operator to remotely monitor and control the devices at the Control Layer 110 and Production Layer 105. Additionally, the SCADA Server Component 115A collects data from the lower layers 105, 110 and processes the information to make it available to the Unified Plant Knowledge Warehouse 115B. The Unified Plant Knowledge Warehouse 115B provides further processing and storage of the data received from the lower layers 105, 110. Various functionality may be provided by the Unified Plant Knowledge Warehouse 115B. For example, in some embodiments, the Unified Plant Knowledge Warehouse 115B includes functionality for generating analytics based on the data generated by the lower layers 105, 110.

Each Intelligent PLC 110E and 110F includes three basic portions: a processor, a non-transitory, non-volatile memory system, and a data connector providing input/output functionality. The non-volatile memory system may take many forms including, for example, a removable memory card or flash drive. Applications that may execute within the Intelligent PLCs 110E and 110F are described in greater detail below with reference to FIG. 2. The data connector of Intelligent PLC 110E is connected (wired or wirelessly) to Field Devices 110A and 110B. Similarly, the data connector of Intelligent PLC 110F is connected to Field Devices 110C and 110D. Any field devices known in the art may be used with the Intelligent PLC described herein. Example field devices that may be used with the Intelligent PLC include, without limitation, pressure switches, sensors, push buttons, flow switches, and level switches. Note that the Intelligent PLCs 110E and 110F may be integrated into the production environment piecemeal. For example, in FIG. 2, Production Units 105A and 105B are connected through their respective field devices to Intelligent PLCs 110E and 110F, while Production Unit 105C communicates directly through its respective Field Device 110G to the Unified Plant Knowledge Warehouse 115B.

The Intelligent PLCs 110E and 110F may enrich data using additional context dimensions compared to state of the art systems (e.g. control knowledge, environmental conditions, and service incidences). This allows insights to be made from data analytics with higher confidence and quality. In some embodiments, the system 100 uses semantic data representation languages and standards for contextualization of data in automation systems. This allows business analytics as well as SCADA-level historians (e.g. OSI PI asset framework) to be configured with minimal effort for integration with data from other systems/devices/sources. Also the system 100 may provide model-based semantic analytics at the Control Layer 110. Thus, analytical algorithms can be updated during device runtime and root cause analysis can be improved by providing explicit access to models (instead of compiled logic in a function block). In some embodiments, the system 100 introduces a distributed data sharing system in the Control Layer 110 and integrates with external Big Data infrastructures. Thus, applications can access all required data independent from storage location.

Figure 2:
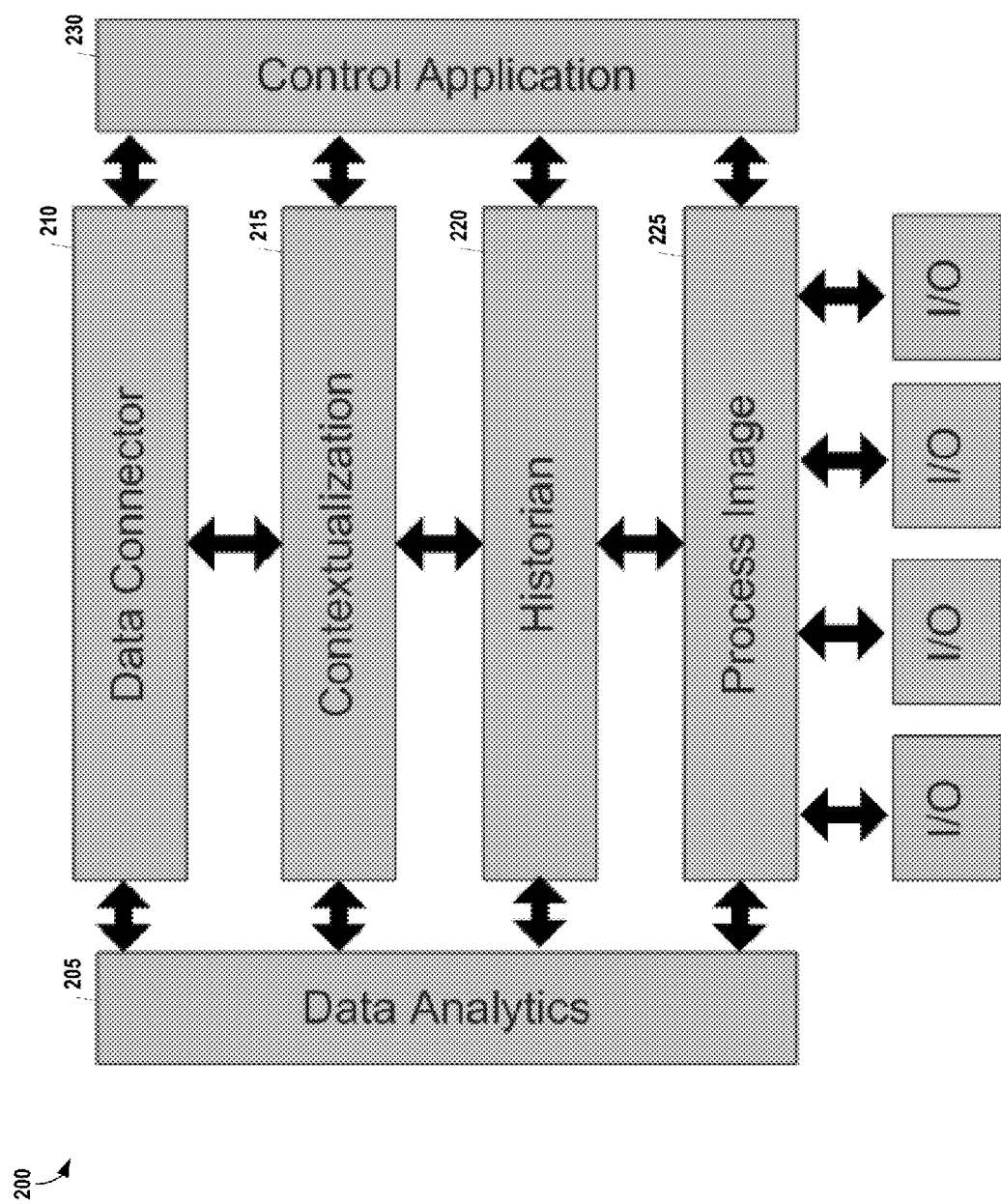
FIG. 2 provides an illustration of the system components included in an Intelligent PLC, according to some embodiments of the present invention.

FIG. 2 provides an illustration of the system components 200 included in an Intelligent PLC, according to some embodiments of the present invention. Process Image Component 225 is a memory area in a controller's CPU volatile system memory which is updated in each processing/scan cycle based on data associated with the production devices (e.g., the inputs and outputs of connected I/Os). In each processing step, the Control Application 230 reads the process image, executes deployed application logic, and writes results back into the process image. Any data captured or generated by the system components 200 may be provided to external components via a Data Connector Component 210. In some embodiments, the Data Connector Component 210 delivers data via a push methodology (i.e., actively sending to external component). In other embodiments, a pull methodology may be used where data is queried by external component). Additionally, push and pull methodologies may be combined in some embodiments such that the Intelligent PLC is configured to handle both forms of data transfer.

Continuing with reference to FIG. 2, the process image of each cycle is read and permanently stored on a non-volatile physical storage medium by the Historian Component 220. In some embodiments, this Historian Component 220 is configured to deploy data compression algorithms to reduce data volume. It thereby can provide applications with access to past process images. Data may be stored either for a fixed time window or online algorithms are used to realize dynamic caching heuristics. As part of the Historian Component 220, intelligent data generation algorithms may continuously analyze the process image and context to adjust data generation parameters (e.g. sampling rate) of connected I/Os. For example, for fast changing sensor signals, a high sampling rate may be selected while for slowly changing sensor signals a lower sampling rate is sufficient. The Data Analytics Component 205 comprises a set of data analysis algorithms that process the current or past process images (queried from the historian). Various data analysis algorithms may be included in the Data Analytics Component 205. For example, in some embodiments, these algorithms include one or more of clustering, classification, logic-based reasoning, and statistical analysis algorithms. Moreover, algorithms may be specified via a model which can be deployed during runtime on the device. The Data Analytics Component 205 may also include various analytical models and dedicated algorithms to interpret these models. The results generated by the Data Analytics Component 205 may be stored in the Historian Component 220, written back to the Process Image Component 225 and/or provided to external components via the Data Connector Component 210. Thus, the Intelligent PLC may be viewed as a device for providing distributed analytics to the other devices in the automation system.

A Contextualization Component 215 annotates incoming data with context information to facilitate its later interpretation. Context information, as used herein, may include any information that describes the meaning of data. For example, context of data in automation systems may include information about the device that generated the data (e.g., a sensor), about the structure of the automation system (e.g., topology of a plant), about the working mode of the system (e.g., downtime event), about the automation software and its status while the data was generated, and/or about the product/batch that was produced while the data was generated. The Contextualization Component is configured to provide data to any of the other components for more specific processing needs. The context information generated by the Contextualization Component 215 may not be restricted to the asset structure but may also include control knowledge, product-specific information, process information, event information, and potentially other aspects such external events like weather information. Some context information may be imported from engineering tools (e.g. Siemens Totally Integrated Automation tools). Additionally, in some embodiments, the Contextualization Component 215 provides semantic contextualization. The context may be represented by a standard modeling language (e.g. Web Ontology Language, Resource Description Framework) where the meaning of the language constructs is formally defined. Contextualization of data with these semantic modeling standards enables business analytics applications to automatically understand and interpret the data provided from the automation system without manual configuration effort.

Figure 3:
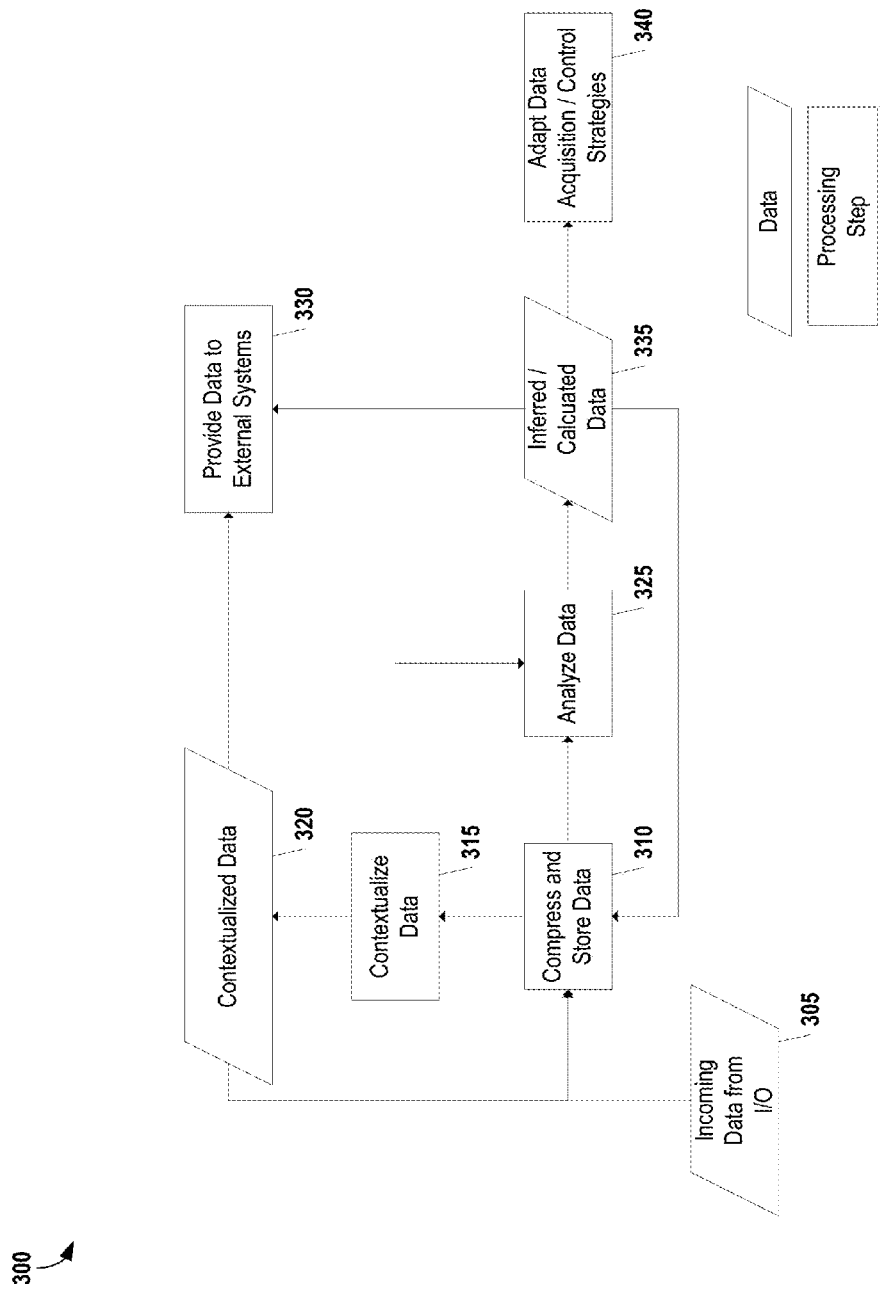
FIG. 3 provides a flowchart illustrating the data processing performed by the Intelligent PLC, according to some embodiments of the present invention

FIG. 3 provides a flowchart 300 illustrating the data processing performed by the Intelligent PLC, according to some embodiments of the present invention. Incoming data 305 from the I/O ports of Intelligent PLC is compressed and stored at processing step 310. The compressed data is contextualized at processing step 315. Then, the contextualized data 320 is provided to external systems at processing step 330. Note that the contextualized data 320 may include event information, as well as information regarding the operational characteristics of the automation system as the time the event is occurred Continuing with reference to FIG. 3, raw data from processing step 310 and/or contextualized data from processing step 315 are analyzed at processing step 325. Various forms of analysis may be performed at processing step 325 including data analytics as discussed above with respect to FIG. 2. The result of processing step 325 is inferred/calculated data 335. At processing step 340, the inferred/calculated data 335 is used to adapt control parameters or data acquisition strategy. For example, the inferred/calculated data 335 may be used to adapt a sampling rate of connected production devices. The inferred/calculated data 335 can be compressed as well as stored by returning to process step 310. Additionally, the inferred/calculated data 335 may be provided to external systems at processing step 330.

In some embodiments, the Intelligent PLC provides an ecosystem on top of which applications may be constructed. For example, in one embodiment, the software of the Intelligent PLC includes an application programming interface (API) specifying how external software components can interact with the software operating on the Intelligent PLC. This API may include functions such as querying historical controller data, setting alerts based on production device activity, and contextualizing controller data with high-layer data. The API may also be used to network individual Intelligent PLCs together, thereby creating a network of controllers which can enhance their processing of data by sharing information such as contextual data regarding their respective connected production devices.

The Intelligent PLC described herein provides various benefits over conventional PLCs. For example, the production process can be optimized to increase production Key Performance Indicators such as machine utilization or throughput. Additionally, controller behavior can be optimized by adapting data acquisition parameters (e.g. sampling rate of sensors, compression parameters), PLC configuration (e.g., cycle time) and control strategies for actuators (e.g., reduce communication overhead, improve robustness, etc.). Third, contextualized data can be provided to other devices such as, for example, SCADA, MES, other PLCs, and intelligent field devices. For all data, context information such as the current PLC/control configuration, weather conditions, product information may be included. Additionally, events may be identified in the data steam, data relevant to the event can be collected, and the event data, along without relevant data can be provided to other devices.

As an example of the general applicability of the Intelligent PLC, consider an automotive assembly plant. In an automotive door assembly manufacturing cell, typically one or more PLCs are used for tasks such as receiving inputs from multiple sensors (e.g. proximity or photo eye sensors) of a conveyor system and issuing speed commands to the motor/drive that controls the speed of a skid/car body residing on the conveyor. The PLC communicates with the conveyor system to position the skid at the ideal location, which is the first and very important task in the door assembly cell. Once the skid is perfectly positioned, the PLC then coordinates multiple robot arms to perform remaining tasks such as placing the doors on to the car body, welding, etc. The PLC also informs the up and down-stream automation cells about the starting and completing of the current task. One of the main quality issues of this process is that the car door is not positioned correctly on the car body and the welding is done at the wrong spot. The cause may be multifold and very complex. For example, the car skid is not positioned correctly or the car doors may not be picked correctly by the robot arm. In the first case, the wrong skid position may be caused by an invalid sensor reading (e.g. dirty and oily bar code). With conventional PLCs and automation system, the error is detected very late, at the end of line (EOL) quality check and the cause is unknown. The cost is very high to rework the area, line or even the entire car in order to fix the problem.

With the Intelligent PLC described herein in various embodiments, all data (e.g. sensor inputs, control variables, etc.) may be historized at high sampling rate inside the Intelligent PLC. Efficient compression may be applied to reduce the required storage in Intelligent PLC, and all important data may be recorded. The data may be used to learn normal "good" operation patterns, detect anomalies, and proactively react to prevent errors. Advanced data analytics may also be applied. Moreover, with Intelligent PLC, data may be contextualized with asset model (e.g. relations between sensors, conveyor, skid, etc.), control model (additional control logics and variables that may indicate potential issue), and other models such as the process model and the event model. In conventional automation systems, such models are typically reconstructed at higher automation layer such as Manufacturing Execution Systems (MES), and without control knowledge. However, this may present inefficiencies due to the lack of information at the PLC level. For example, if a bar code is dirty, the wrong positions are sent to the PLC, which then issues the wrong speed commands to the conveyor system. Eventually, it will trigger at the final re-positioning stage additional controls and oscillations in order to compensate the early sensor reading error. Such control knowledge is not available outside the controller. With Intelligent PLC, the data may be contextualized and analyzed with such control knowledge. If a welding quality issue arises, the Intelligent PLC can locate the error with the addition "unwanted" oscillations in the control logic, and link the quality issue (e.g., welding error) to a set of sensors. Moreover, with control layer analytics generated in real-time (or near real-time), such errors can be identified immediately, and operators can be informed earlier to stop the line so that they can check the sensor readings and avoid a potential costly welding problem. With statistical quality control based on the Intelligent PLC historian functionality, patterns can be learned and abnormalities can be identified ahead of time. With the Intelligent PLC's contextualization and analytics functionality, abnormalities can be analyzed and root causes can be discovered. Thus, the Intelligent PLC is able to deliver not just symptoms but diagnoses.

An additional example of how the Intelligent PLC may be utilized in some embodiments is in controlling the fermentation tank of a beer brewery process. For example, the PLC may be responsible for regulating pressure and temperature in the tank. Several temperature and pressure sensors are available to monitor the current status of the fermentation process. To regulate pressure in the tank the PLC controls a pressure valve that can be open to reduce pressure. In addition, the PLC controls another valve which regulates the flow rate of the coolant system that is used to adjust temperature level in the tank.

The Intelligent PLC may be configured with historian functionality to store all sensors and control data locally for several days and month. This historian functionality may support the native sampling rates of the sensors and all relevant data points can be captured—including frequent signal changes/oscillations in the area of milliseconds which typically cannot be reliably captured by traditional systems. Based on original high resolution data fast oscillation of valves (i.e. valve opens and closes within milliseconds) can be detected and historized by the Intelligent PLC. Storing data directly on the Intelligent PLC also provides the necessary reliability that might be required by certain regulations in the food and beverage industry. With the Intelligent PLC, the historian function will ensure that no data is lost.

The availability of mid/long-term high fidelity data enabled by the historian function may be used in analyzing data directly on the Intelligent PLC. For example, consider the temperature of the fermentation tank, which is influenced by an adjacent valve and a cooling system. By not only monitoring the historic trend of the temperature curve (as done on today on SCADA level) but also by considering PLC internal variables such as the position of the valve and the connected cooling system, an in-field predictive model can be constructed that is able to learn if the temperature of the liquid in the fermentation tank is going to reach a critical point before it actually happens. For example, oscillation of the valve can be an indication that the coolant system is not properly working and, if this is the case, there is a high probability that temperature will eventually go above its threshold.

In conventional PLCs, there is no model which describes how data points should be interpreted. For example, the PLC does not know what type of sensor is connected and which unit of measurement is used, etc. However, this information is needed to fully analyze the data. As described above, with reference to FIG. 2, the Intelligent PLC may contextualize data in order to describe the meaning of the data points and how they are related to each other. For example, the Intelligent PLC may have a model describing that the temperature sensor measures temperatures in Fahrenheit and that the sensor belongs to the Fermentation Tank 1 which is regulated by Coolant System 2. This is important information for detecting the root cause of a problem and for realizing predictive monitoring of temperatures as described in the last paragraph. If the system knows that Coolant System 2 is responsible for controlling temperature in Fermentation Tank 1 than it can infer that a problem with temperature of Fermentation Tank 1 could be due to a valve or pressure problem in Coolant System 2. This means by leveraging local context information the Intelligent PLC does not only provide information of what is happing in the control system but it will also provide information on the reasons why it happens and what could be done to avoid problems.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

We claim:

1. A method of operating an intelligent programmable logic controller over a plurality of scan cycles, the method comprising:

creating, by the intelligent programmable logic controller, a process image area in a volatile computer-readable storage medium in the intelligent programmable logic controller;

updating, by the intelligent programmable logic controller, the process image area during each scan cycle with contents comprising input data for controlling a production unit included in an automation system and output data generated by the production unit;

transmitting, by the intelligent programmable logic controller, the input data to the production unit via one or more field devices included in the automation system to control the production unit;

storing, by the intelligent programmable logic controller, the contents of the process image area during each scan cycle on a non-volatile computer-readable storage medium in the intelligent programmable logic controller; and annotating, by the intelligent programmable logic controller, the contents of the process image area with automation system context information stored outside the process image area to generate contextualized data specified in a semantic modeling language, wherein the automation system context information comprises a status indicator indicative of a status of the automation system while the contents of the process image area were generated.

2. The method of claim 1, further comprising:
applying, by the intelligent programmable logic controller, one or more data analytics algorithms to the contextualized data to yield calculated data; and
adjusting one or more data generation parameters of the production unit based on the calculated data.

3. The method of claim 1, further comprising:
applying, by the intelligent programmable logic controller, one or more data analytics algorithms to the contents of the process image area to yield calculated data; and
adjusting one or more data generation parameters of the production unit based on the calculated data.

4. The method of claim 3, further comprising:
retrieving, by the intelligent programmable logic controller, historical process image data from the non-volatile computer-readable storage medium; and
executing, by the intelligent programmable logic controller, the one or more data analytics algorithms on the historical process image data.

5. The method of claim 1, further comprising:
compressing, by the intelligent programmable logic controller, the contents of the process image area during each scan cycle prior to storing the contents on the non-volatile computer-readable storage medium.

6. The method of claim 1, further comprising; compressing, by the intelligent programmable logic controller, the contextualized data to yield compressed contextualized data; and
storing, by the intelligent programmable logic controller, the compressed contextualized data on the non-volatile computer-readable storage medium in the intelligent programmable logic controller.

7. The method of claim 1, wherein the automation system context information comprises one or more of an indication of a device that generated the data, a structural description of an automation system comprising the intelligent programmable logic controller, a system working mode indicator, and information about a product that was produced when the contents of the process image area were generated.

8. The method of claim 1, wherein the automation system context information further comprises a description of automation software utilized by the intelligent programmable logic controller.

9. An intelligent programmable logic controller comprising:
a processor configured to execute according to a scan cycle;
a volatile computer-readable storage medium comprising a process image area;
a non-volatile computer-readable storage medium; and
a plurality of controller components executed by the processor according to the scan cycle, the plurality of controller components comprising:
a data transfer component configured to update the process image area during each scan cycle with contents comprising input data for controlling a production unit included in an automation system and output data generated by the production unit,
a control application component configured to execute application logic on the contents of the process image area,
a historian component configured to store the contents of the process image area during each scan cycle on the non-volatile computer-readable storage medium,
a contextualization component configured to generate contextualized data by annotating the contents of the process image area with automation system context information using a semantic modeling language, wherein the automation system context information is stored outside of the process image area and comprises a status indicator indicative of a status of the automation system while the contents of the process image area were generated, and
a data connector component configured to (i) transmit the contextualized data to one or more external components and (ii) transmit the input data to the production unit via one or more field devices included in the automation system to control the production unit.

10. The intelligent programmable logic controller of claim 9, further comprising:
a data analytics component configured to execute one or more data analytics algorithms on the contextualized data to yield calculated data.

11. The intelligent programmable logic controller of claim 10, wherein the historian component is further configured to adjust one or more data generation parameters of the production unit based on the calculated data.

12. The intelligent programmable logic controller of claim 11, wherein the one or more data generation parameters comprise a sampling rate value.

13. The intelligent programmable logic controller of claim 11, wherein the data analytics component is further configured to:
retrieve historical process image data from the non-volatile computer-readable storage medium; and
execute the one or more data analytics algorithms on the historical process image data.

14. The intelligent programmable logic controller of claim 9, wherein the historian component is further configured to:
compress the contents of the process image area during each scan cycle prior to storing the contents on the non-volatile computer-readable storage medium.

15. An article of manufacture for operating an intelligent programmable logic controller over a plurality of scan cycles; the article of manufacture comprising a non-transitory, tangible computer-readable medium holding computer-executable instructions for performing a method comprising:
creating a process image area in a volatile computer-readable storage medium in the intelligent programmable logic controller;
updating the process image area during each scan cycle with contents comprising input data for controlling a production unit included in an automation system and output data generated by the production unit;
transmitting the input data to the production unit via one or more field devices included in the automation system to control the production unit:
storing the contents of the process image area during each scan cycle on a non-volatile computer-readable storage medium in the intelligent programmable logic controller; and
annotating the contents of the process image area with automation system context information stored outside the process image area to generate contextualized data specified in a semantic modeling language, wherein the automation system context information comprises status indicator indicative of a status of the automation system while the contents of the process image area were generated.

16. The article of manufacture of claim 15, wherein the method further comprises:

applying one or more data analytics algorithms to the contextualized data to yield calculated data; and adjusting one or more data generation parameters of the production unit based on the calculated data.

17. The article of manufacture of claim 16, wherein the method further comprises retrieving historical process image data from the non-volatile computer-readable storage medium; and executing the one or more data analytics algorithms on the historical process image data.

18. The article of manufacture of claim 15, wherein the method further comprises:

transmitting the contextualized data to one or more external components.

19. The article of manufacture of claim 15, wherein the method further comprises compressing the contents of the process image area during each scan cycle prior to storing the contents on the non-volatile computer-readable storage medium.

\* \* \* \* \*